(12) United States Patent
Ghosh et al.

(10) Patent No.: US 12,579,009 B2
(45) Date of Patent: Mar. 17, 2026

(54) SUSTAINABILITY MODES IN SOFTWARE ENGINEERING

(71) Applicant: Dell Products L.P., Round Rock, TX (US)

(72) Inventors: Manav Ghosh, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 543 days.

(21) Appl. No.: 18/301,525

(22) Filed: Apr. 17, 2023

(65) Prior Publication Data

US 2024/0345816 A1     Oct. 17, 2024

(51) Int. Cl.
*G06F 9/46* (2006.01)
*G06F 9/50* (2006.01)

(52) U.S. Cl.
CPC .......... *G06F 9/5094* (2013.01); *G06F 9/5044* (2013.01); *G06F 2209/501* (2013.01)

(58) Field of Classification Search
None
See application file for complete search history.

(56) References Cited

U.S. PATENT DOCUMENTS

2011/0246987 A1* 10/2011 Diwakar ............... G06F 9/5094
                                                    718/1
2013/0339776 A1* 12/2013 Jagadishprasad ..... G06F 9/5094
                                                    713/340

* cited by examiner

*Primary Examiner* — Bing Zhao
(74) *Attorney, Agent, or Firm* — Daly, Crowley, Mofford & Durkee, LLP

(57) ABSTRACT

A method comprising: storing, in a memory, a database that identifies whether each of a plurality of nodes is powered by a sustainable power source or a non-sustainable power source; receiving a request to perform an action; detecting whether the plurality of nodes includes one or more candidate nodes, each of the candidate nodes being a node that is powered by a sustainable power source and has both capacity and capability to execute the request, the detecting being performed based, at least in part, on the database; when the plurality of nodes includes one or more candidate nodes, routing the request to one of the candidate nodes; and when the plurality of nodes does not include any candidate nodes, routing the request.

20 Claims, 7 Drawing Sheets

Figure 4:
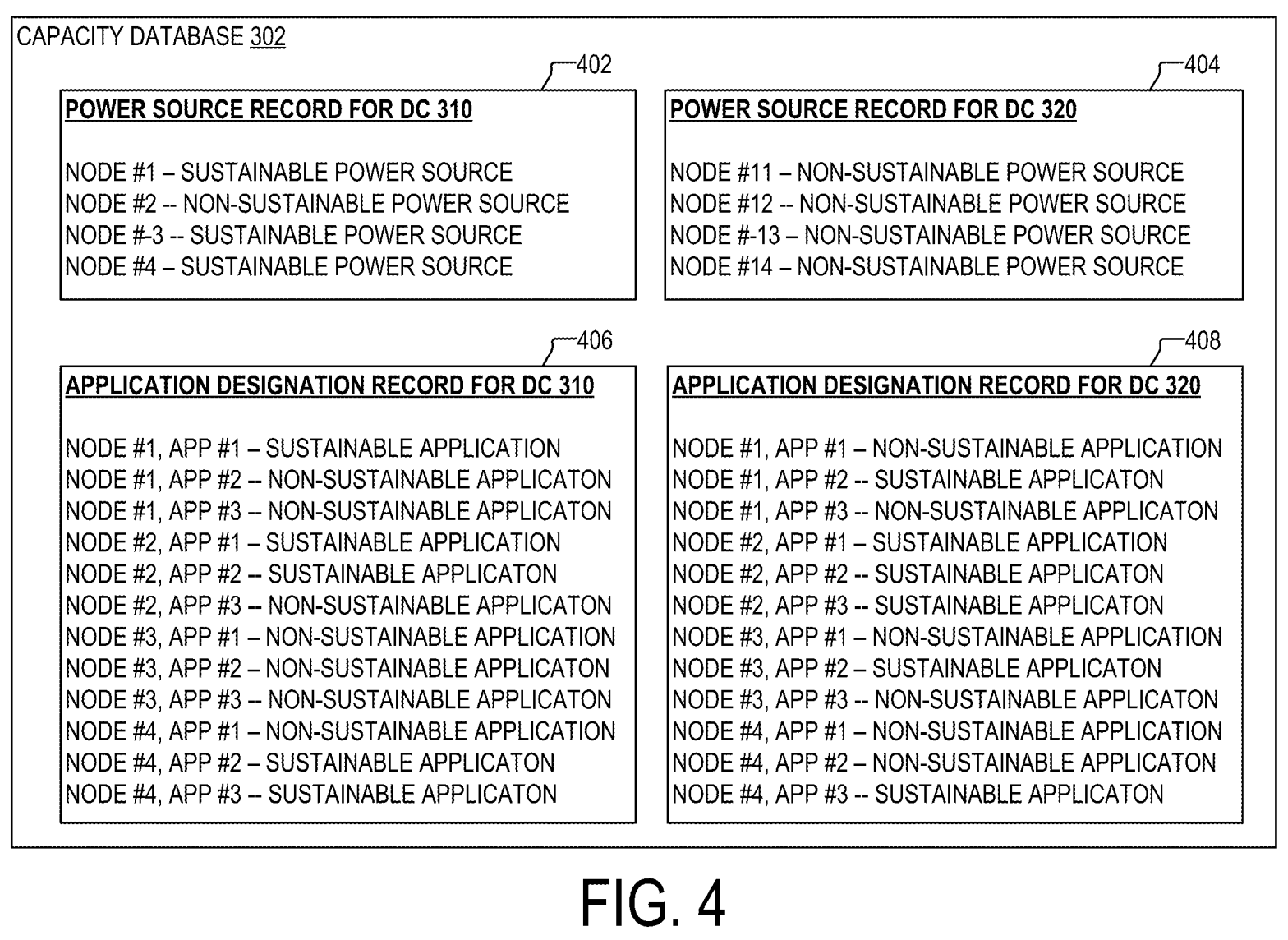

CAPACITY DATABASE 302

POWER SOURCE RECORD FOR DC 310 — 402

NODE #1 – SUSTAINABLE POWER SOURCE
NODE #2 – NON-SUSTAINABLE POWER SOURCE
NODE #3 – SUSTAINABLE POWER SOURCE
NODE #4 – SUSTAINABLE POWER SOURCE

POWER SOURCE RECORD FOR DC 320 — 404

NODE #11 – NON-SUSTAINABLE POWER SOURCE
NODE #12 – NON-SUSTAINABLE POWER SOURCE
NODE #-13 – NON-SUSTAINABLE POWER SOURCE
NODE #14 – NON-SUSTAINABLE POWER SOURCE

APPLICATION DESIGNATION RECORD FOR DC 310 — 406

NODE #1, APP #1 – SUSTAINABLE APPLICATION
NODE #1, APP #2 – NON-SUSTAINABLE APPLICATON
NODE #1, APP #3 – NON-SUSTAINABLE APPLICATON
NODE #2, APP #1 – SUSTAINABLE APPLICATION
NODE #2, APP #2 – SUSTAINABLE APPLICATON
NODE #2, APP #3 – NON-SUSTAINABLE APPLICATON
NODE #3, APP #1 – NON-SUSTAINABLE APPLICATION
NODE #3, APP #2 – NON-SUSTAINABLE APPLICATON
NODE #3, APP #3 – NON-SUSTAINABLE APPLICATON
NODE #4, APP #1 – NON-SUSTAINABLE APPLICATION
NODE #4, APP #2 – SUSTAINABLE APPLICATON
NODE #4, APP #3 – SUSTAINABLE APPLICATON

APPLICATION DESIGNATION RECORD FOR DC 320 — 408

NODE #1, APP #1 – NON-SUSTAINABLE APPLICATION
NODE #1, APP #2 – SUSTAINABLE APPLICATON
NODE #1, APP #3 – NON-SUSTAINABLE APPLICATON
NODE #2, APP #1 – SUSTAINABLE APPLICATION
NODE #2, APP #2 – SUSTAINABLE APPLICATON
NODE #2, APP #3 – SUSTAINABLE APPLICATON
NODE #3, APP #1 – NON-SUSTAINABLE APPLICATION
NODE #3, APP #2 – SUSTAINABLE APPLICATON
NODE #3, APP #3 – NON-SUSTAINABLE APPLICATON
NODE #4, APP #1 – NON-SUSTAINABLE APPLICATION
NODE #4, APP #2 – NON-SUSTAINABLE APPLICATON
NODE #4, APP #3 – SUSTAINABLE APPLICATON

| | |
|---|---|
| 192.16.1.1 | SUBSCRIBED FOR SUSTAINABLE ROUTING |
| 192.16.1.2 | NOT SUBSCRIBED FOR SUSTAINABLE ROUTING |
| 192.16.1.3 | SUBSCRIBED FOR SUSTAINABLE ROUTING |
| 192.16.1.4 | SUBSCRIBED FOR SUSTAINABLE ROUTING |
| 192.16.1.5 | NOT SUBSCRIBED FOR SUSTAINABLE ROUTING |
| 192.16.1.6 | SUBSCRIBED FOR SUSTAINABLE ROUTING |

SUSTAINABILITY MODES IN SOFTWARE ENGINEERING

BACKGROUND

Sustainable Software Architecture is of great interest in the industry and most organizations are currently striving to adopt various sustainable solutions. However, some current sustainable software solutions suffer from several disadvantages, including higher energy cost, reduced software performance, and increased cost of software development. Accordingly, the need exists for sustainable software solutions that address at least some of these disadvantages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: storing, in a memory, a database that identifies whether each of a plurality of nodes is powered by a sustainable power source or a non-sustainable power source; receiving a request to perform an action; detecting whether the plurality of nodes includes one or more candidate nodes, each of the candidate nodes being a node that is powered by a sustainable power source and has both capacity and capability to execute the request, the detecting being performed based, at least in part, on the database; when the plurality of nodes includes one or more candidate nodes, routing the request to one of the candidate nodes; and when the plurality of nodes does not include any candidate nodes, routing the request by executing a routing process that is neutral with respect to whether any of the plurality of nodes is powered by a sustainable power source, wherein each of the plurality of nodes includes a computing device that is part of a respective data center.

According to aspects of the disclosure, a system is provided comprising: a memory configured to store a database that identifies whether each of a plurality of nodes is powered by a sustainable power source or a non-sustainable power source; and at least one processor that is operatively coupled to the memory, the at least one processor being configured to perform the operations of: receiving a request to perform an action; detecting whether the plurality of nodes includes one or more candidate nodes, each of the candidate nodes being a node that is powered by a sustainable power source and has both capacity and capability to execute the request, the detecting being performed based, at least in part, on the database; when the plurality of nodes includes one or more candidate nodes, routing the request to one of the candidate nodes; and when the plurality of nodes does not include any candidate nodes, routing the request by executing a routing process that is neutral with respect to whether any of the plurality of nodes is powered by a sustainable power source, wherein each of the plurality of nodes includes a computing device that is part of a respective data center.

According to aspects of the disclosure, a non-transitory computer-readable medium storing one or more processor-executable instructions, which, when executed by at least one processor, cause the at least one processor to perform the operations of: storing, in a memory, a database that identifies whether each of a plurality of nodes is powered by a sustainable power source or a non-sustainable power source; receiving a request to perform an action; detecting whether the plurality of nodes includes one or more candidate nodes, each of the candidate nodes being a node that is powered by a sustainable power source and has both capacity and capability to execute the request, the detecting being performed based, at least in part, on the database; when the plurality of nodes includes one or more candidate nodes, routing the request to one of the candidate nodes; and when the plurality of nodes does not include any candidate nodes, routing the request by executing a routing process that is neutral with respect to whether any of the plurality of nodes is powered by a sustainable power source, wherein each of the plurality of nodes includes a computing device that is part of a respective data center.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4 is a diagram of an example of a capacity database, according to aspects of the disclosure;

FIG. 5 is a diagram of an example of a subscription database, according to aspects of the disclosure;

DETAILED DESCRIPTION

Figure 1:
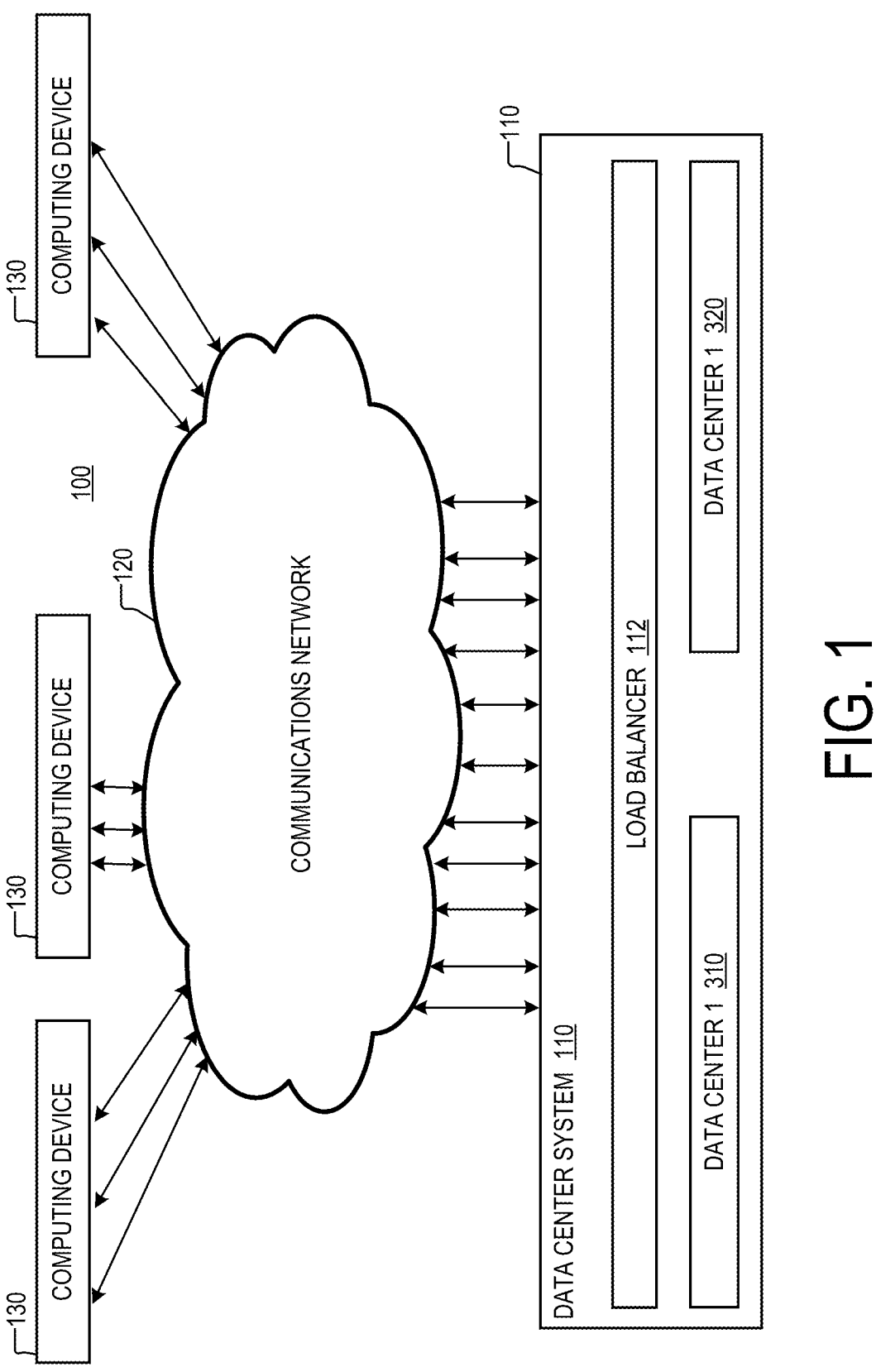
FIG. 1 is a diagram of an example of a system, according to aspects of the disclosure.

FIG. 1 is a diagram of an example of a system 100, according to aspects of the disclosure. As illustrated, the system 100 may include a data center system 110, which is coupled to a plurality of computing devices 130 via a communications network 120. The communications network 120 may include one or more of a fibre channel (FC) network, the Internet, a local area network (LAN), a wide area network (WAN), and/or any other suitable type of network. Each of the computing devices 130 may be the same or similar to the computing device 700, which is discussed further below with respect to FIG. 7. By way of example, each of the computing devices may include a desktop, a laptop, a smartphone, an internet-of-things (IoT) device, and/or any other suitable type of computing device. The data center system 110 may include a load balancer 112 and data centers 310 and 320. Each of the data centers may include a plurality of computing devices, such as the computing device 700, which is discussed further below with respect to FIG. 7. The load balancer 112 may include one or more computing devices, such as the computing device 700.

The load balancer 112 may be configured to receive requests from the computing devices 130. For each of the received requests, the load balancer 112 may select a recipient data center and/or an application within the recipient data center, after which the load balancer 112 may route the request to the selected data center and/or application. For ease of description, the data center system 110 is depicted as including only two data centers. However, it will be understood that the data center system 110 may include a greater number of data centers. Although not shown, the load balancer 112 may be coupled to each of the data centers 310 and 320 via a communications network. The communications network may include one or more of a wide area network, a local area network, the Internet, and/or any other suitable type of communications network.

Figures 2A, 2B:
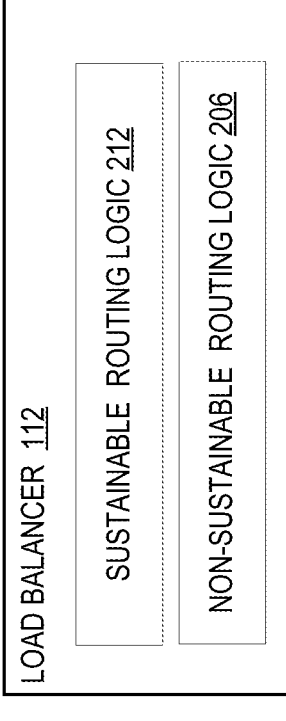
FIG. 2A is a diagram of an example of a load balancer, according to the prior art.
FIG. 2B is a diagram of an example of a load balancer, according to aspects of the disclosure.

FIG. 2A is a diagram of a load balancer 200, according to the prior art. The load balancer 200 may include non-sustainable routing logic 206. The non-sustainable routing logic 206 may be configured to route incoming requests to data centers (in the data center system 110) or individual applications. The routing may be performed based on routing rules and policies that consider the load and/or available capacity of the data centers 310 and 320, as well as the load and/or available capacity of individual nodes and/or applications within the data centers 310 and 320.

FIG. 2B, is a diagram of the load balancer 112, according to aspects of the disclosure. The difference between the load balancer 112 and the load balancer 200 is that the load balancer 112 uses sustainable routing logic 212 in addition to the non-sustainable routing logic 206. The sustainable routing logic 212 may include one or more rules or policies for routing incoming requests that consider the energy sources used by the data centers 310 and 320 (or individual nodes in a data center) as well as the power consumption (and/or energy efficiency) of individual applications that are executed in the data centers 310 and 320.

The routing logic 212 may include one or more processor-executable instructions that implement routing rules or policies, which take into consideration the power source of data centers (or individual nodes within a data center) as well as the power consumption of individual applications. In addition, the rules and policies of the routing logic 212 may also take into consideration one or more of the load and/or available capacity of the data centers 310 and 320, the load and/or available capacity of individual nodes within a data center, and the load and/or available capacity of individual applications. In some implementations, the routing logic 212 may implement at last some of steps 602-604 and 608-612 of the process 600, which is discussed further below with respect to FIG. 6. Although in the present example, the routing logic 212 is implemented in software, alternative implementations are possible in which the routing logic 212 is implemented in hardware or as a combination of hardware and software.

The routing logic 206 may include one or more processor-executable instructions that implement routing rules or policies, which take into consideration the load and/or available capacity of data centers and/or individual nodes in a data center. Unlike the routing logic 212, the routing logic 206 is neutral (i.e., agnostic) with respect to the power source of data centers or nodes, and/or the power consumption of individual nodes or applications. In other words, the routing logic 206 does not implement routing rules or policies which take into consideration the power source of data centers (or individual nodes within a data center) or the power consumption of individual applications. The rules and policies of the routing logic 206 may take into consideration one or more of the load and/or available capacity of the data centers 310 and 320, the load and/or available capacity of individual nodes within a data center, and the load and/or available capacity of individual applications. In some implementations, the routing logic 206 may implement at least some of steps 606 and 616 of the process 600, which is discussed further below with respect to FIG. 6. Although, in the present example, the routing logic 206 is implemented in software, alternative implementations are possible in which the routing logic 206 is implemented in hardware or as a combination of hardware and software. Although in FIG. 2B the routing logic 212 and the routing logic 206 are depicted as discrete entities, it will be understood that the routing logic 206 and the routing logic 212 may be integrated with each other.

Figure 3:
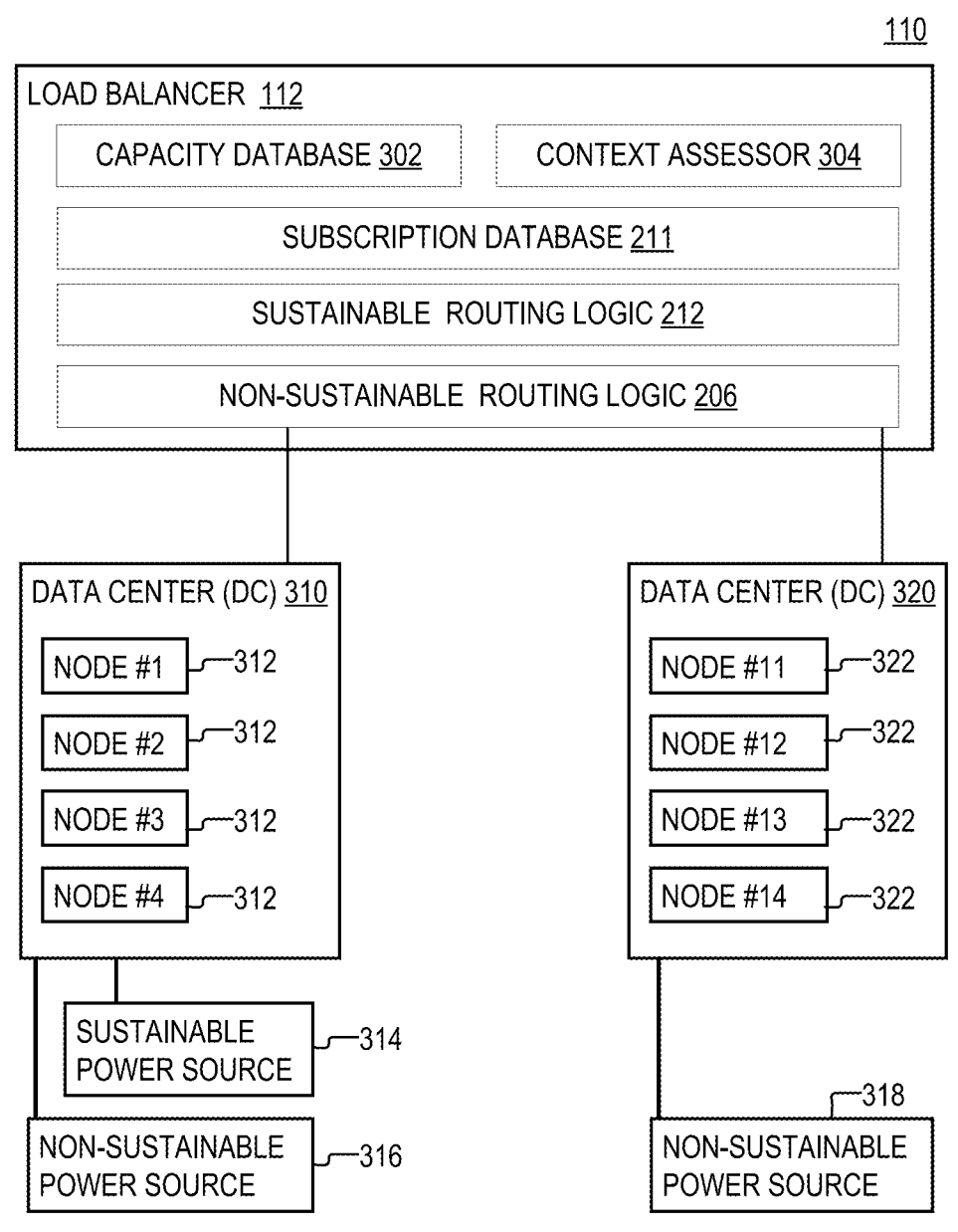
FIG. 3 is a diagram of an example of a system, according to aspects of the disclosure.

FIG. 3 shows the data center system 110 in further detail, according to aspects of the disclosure.

In one aspect, FIG. 3 illustrates that the load balancer 112 may include a capacity database 302 and a context assessor 304. The capacity database 302 may include one or more files or objects that are configured to store information. Additionally, or alternatively, in some implementations, the capacity database 302 may provide routines for retrieving and/or otherwise manipulating the information. For example, the capacity database 302 may include one or more of an object, a plurality of objects, a file (e.g., a text file or an excel spreadsheet), a plurality of files, a relational database, a SQL database, a noSQL database, and/or any other suitable type of database. Although the capacity database 302 is depicted as being stored in the memory of the load balancer 112, alternative implementations are possible in which the capacity database 302 is stored remotely. The information that is stored in the capacity database 302 is discussed further below with respect to FIG. 4.

The context assessor 304 may be configured to obtain the utilization level of each of data centers 310 and 320, individual nodes in the data centers 310 and 320, and/or individual application instances that are executed by the nodes. Furthermore, the context assessor may calculate various statistics, such as the traffic distribution of the data centers 310 and 320 (or individual nodes) throughout the day and/or average workload distribution. Although, in the example of FIG. 3, the context assessor 304 is implemented in software, alternative implementations are possible in which the context assessor 304 is implemented in hardware or as a combination of hardware or software.

In some implementations, the context assessor 304 may be used by the load balancer 112 to identify the utilization level of any of the nodes in the data center 310 and/or data center 320. In some implementations, the utilization level of a node may be the utilization level of a hardware resource of the node. The hardware resource may be a processor, a memory, a network adapter, etc. For instance, if the processor of a node has a 90% utilization level, the node may also be said to have a 90% utilization level. As another example, if a random-access memory of the node is 45% full, the node may be said to have a 45% utilization level.

In some implementations, the context assessor 304 may be used by the load balancer 112 to determine the utilization level of any of the application instances that are executed in the nodes in data centers 310 and/or 320. In one example, the utilization level of an application instance may be measured by the utilization level of the node (e.g., one of nodes 312 and 322) that is executing the application instance. In such instances, the utilization level of the node may also be considered to be the utilization level of the application instance. For example, if the node has a utilization level of 90%, the application instance may also be said to have a utilization level of 90%.

Additionally or alternatively, in some implementations, the utilization level of an application instance may be a metric that is different from the utilization level of the node that is executing the application instance. In such implementations, the utilization level of the application instance may be measured by an operational metric that is specific to that application instance. For example, if the application instance is allowed to execute a maximum of 4 threads, and all 4 threads are currently active, the application instance may be said to have 100% utilization. Alternatively, if the application is allowed to execute a maximum of 4 threads, and only 2 threads are currently active, the application instance may be said to have 50% utilization. As another example, if a queue of the application includes 10 or more requests that are waiting to be executed, the application instance may be said to have 100% utilization. On the other hand, if the queue includes only 5 requests, the utilization rate of the application may be said to have 50% utilization. It will be understood that the present disclosure is not limited to any specific metric or set of metrics for measuring the utilization rate of data center nodes and/or application instances. As used throughout the disclosure, the phrases "utilization level", "available capacity", and "load" are used interchangeably.

In another aspect, FIG. 3 illustrates that the data center 310 may include a plurality of nodes 312. Each of the nodes 312 may be a server or a computing device, such as the computing device 700, which is discussed further below with respect to FIG. 7. Each of the nodes 312 may be configured to execute a different respective instance of each of a plurality of applications. According to the present example, the applications are herein referred to as Application 1, Application 2, and Application 3. The applications may include any application that is desired to be executed in a data center. Stated succinctly, the present disclosure is not limited to any specific application being executed on any of the nodes 312. For case of description, the nodes 312 are enumerated as Node 1, Node 2, Node 3, and Node 4. However, it will be understood that the present disclosure is not limited to any specific number of nodes being present in the data center 310.

In another aspect, FIG. 3 illustrates that the data center 320 may include a plurality of nodes 322. Each of the nodes 322 may be a server or a computing device, such as the computing device 700, which is discussed further below with respect to FIG. 7. Each of the nodes 322 may be configured to execute a different respective instance of each of the plurality of applications (i.e., Application 1, Application 2, and Application 3). For ease of description, the nodes 322 are enumerated as Node 11, Node 12, Node 13, and Node 14. However, it will be understood that the present disclosure is not limited to any specific number of nodes being present in the data center 320. In the present example, each of the nodes 312 and 322 executes instances of the same set of applications. However, alternative implementations are possible in which any two of the nodes 312 and 322 execute instances of different applications. Moreover, alternative implementations are possible in which any of nodes 312 and 322 executes more than one instance of the same application. For example, the same node may execute both sustainable and non-sustainable instances of the same application.

In another aspect, FIG. 3 illustrates that the data center 310 may be powered by a sustainable power source 314 and a non-suitable power source 316. In one example, the sustainable power source 314 may include a renewable energy power source, such as a solar power source, a wind power source, or a water power source. Additionally or alternatively, the sustainable power source 314 may include a nuclear power source. The non-sustainable power source 316 may include a fossil fuel power source, such as a gas, coal, or oil power source. In some implementations, some of the nodes 312 may be powered by the sustainable power source 314 while others of the nodes 312 are powered by the non-sustainable power source 316. In other words, different ones of nodes 312 may be powered by different types of power sources.

In yet another aspect, FIG. 3 illustrates that the data center 320 may be powered by a non-suitable power source 318. The non-sustainable power source 318 may include a fossil fuel power source, such as a gas, coal, or oil power source. In the present example, the data center 320 is not powered by any sustainable power sources, such as wind, solar, water, and possibly nuclear.

In yet another aspect, the load balancer 112 may include a subscription database 211. The subscription database 211 may include one or more files or objects that are configured to store information. Additionally, or alternatively, in some implementations, the subscription database 211 may provide routines for retrieving and/or otherwise manipulating the information. For example, the subscription database may include one or more of an object, a plurality of objects, a file (e.g., a text file or an excel spreadsheet), a plurality of files, a relational database, a SQL database, a noSQL database, and/or any other suitable type of database. Although the subscription database 211 is depicted as being stored in the memory of the load balancer 112, alternative implementations are possible in which the subscription database 211 is stored remotely. The information that is stored in the subscription database 211 is discussed further below with respect to FIG. 5.

FIG. 4 shows the capacity database 302 in further detail. As illustrated the capacity database 302 may include portions 402 and 404, respectively. Portion 402 may identify the type of power source that is used to power each of the nodes 312 in the data center 310. In the example of FIG. 4, portion 402 indicates that Node 1 is powered by a sustainable power source (e.g. power source 314), Node 2 is powered by a non-sustainable power source (e.g., power source 316), Node 3 is powered by a sustainable power source (e.g., power source 314), and Node 4 is powered by a sustainable power source (e.g., power source 314). Portion 404 identifies the type of power source that is used to power each of the nodes 322 in the data center 320. In the example of FIG. 4, portion 404 indicates that each of the nodes 322 is powered by a non-sustainable power source (e.g., power source 318).

In another aspect, FIG. 4 illustrates that the capacity database 302 may include portions 406 and 408. Portion 406 may designate each (or at least one) of the application instances that are executed on each (or at least one) of the nodes 312 of data center 310 as either a sustainable application or a non-sustainable application. Portion 408 may designate each (or at least one) of the application instances that are executed on each (or at least one) of the nodes 322 as either a sustainable application or a non-sustainable application.

Portion 406 indicates that the instances of Application 1 that are executed on Nodes 1 and 2 are sustainable applications, while the instance of Application 1 that is executed on Nodes 3 and 4 are non-sustainable applications. Portion 404 further indicates that the instances of Application 2 that are executed on Nodes 2 and 4 are sustainable applications, while the instances of Application 2 that are executed on Nodes 1 and 3 are non-sustainable applications. Portion 404 indicates that the instances of Application 3 that are executed on Nodes 1, 2, and 3 are non-sustainable applications, while the instance of Application 3 that is executed on Node 4 is a sustainable application.

Portion 408 indicates that the instances of Application 1 that are executed on Nodes 1, 3, and 4 are non-sustainable applications, while the instance of Application 1 that is executed on Node 2 is a sustainable application. Portion 406 further indicates that the instances of Application 2 that are executed on Nodes 1, 2, and 3 are sustainable applications, while the instance of Application 2 that is executed on Node 4 is a non-sustainable application. Portion 406 indicates that the instances of Application 3 that are executed on Nodes 1 and 3 are non-sustainable applications, while the instance of Application 3 that is executed on Nodes 2 and 4 are sustainable applications. FIG. 4 is provided as an example only to illustrate the type of information that can be contained in the capacity database 302. However, the present disclosure is not limited to any specific method for organizing the information that is present in the capacity database 302.

The term "application instance" is now described in further detail. Any two instances of the same application, that are referenced throughout the disclosure, may have the same or different source code. However, irrespective of whether their source code is the same, any two instances of the same application, that are referenced throughout the disclosure, may perform the same function or operation; for example, they can be used to execute a request having the same opcode. In one example, instances of the same application may be configured to receive the same input and produce identical outputs. In another example, instances of the same application may be configured to receive the same input and produce similar outputs. For example, one output may be accurate to 5 decimal places and the other output may be accurate to 10 decimal places. As another example, when the output of an application is an image, the output of one application instance may be an image that has a high resolution, and the output of another application may be the same or similar image, but which has a lower resolution.

As illustrated in the example of FIG. 4, the capacity database 302 may be used to determine which application instances (in the data centers 310 and 320) are sustainable and which application instances are non-sustainable. As used throughout the disclosure, the phrases "sustainable application" and "sustainable application instance" are used interchangeably to describe a first type of application instance. As used throughout the disclosure, the phrases "non-sustainable application" and "non-sustainable application instance" are used interchangeably to describe a second type of application instance.

The difference between "sustainable application instances" and "non-sustainable application instances" is now described in further detail. In one example, the same application (e.g., one of Applications 1, 2, and 3) may have both a sustainable application instance and a non-sustainable application instance. Both the sustainable application instance and the non-sustainable application may use identical source code. However, the sustainable application instance may be limited to executing only 4 active threads, while the non-sustainable application instance may be limited to executing 12 active threads. As can be readily appreciated, the amount of electrical power spent by the sustainable application on operations relating to context switching may be lower than the amount of power spent by the non-sustainable application on the same type of operations. As another example, in some instances, the sustainable application instance may be limited to using fewer processing cores than the non-sustainable application instance.

In another example, a sustainable and a non-sustainable instances of the same application may have different source code. However, the source code of the non-sustainable application instance may be functionally equivalent to the source code of the sustainable application instance. In other words, each of the sustainable and non-sustainable application instances may be configured to produce the same output in response to identical input. However, the sustainable application instance may be configured to use the central processing unit (CPU) of a node, whereas the non-sustainable application instance may be configured to use acceleration hardware of the node, such as a graphical processing unit (GPU) of the node or an artificial intelligence (AI) accelerator. As can be readily appreciated, under some circumstances, the use of acceleration hardware may result in higher energy consumption than the use of the CPU only.

In another example, a sustainable and a non-sustainable instance of the same application may have different resolutions. For example, the sustainable application instance may be configured to produce output that is accurate to 5 decimal places, whereas the non-sustainable application instance may produce output that is accurate to 10 decimal places. In this example, the non-sustainable application instance and the sustainable application instance are arranged to produce substantially the same output in response to identical input.

FIG. 5 is a diagram of an example of the subscription database 211, according to aspects of the disclosure. As illustrated, the subscription database 211 may include a plurality of entries 502. Each entry 502 may identify a different user and indication of whether the user is subscribed for green routing or not. Although in the example of FIG. 5 each user is identified by the user's Internet Protocol (IP) address, alternative implementations are possible in which each user is identified by another identifier, such as a MAC address, user login name, and/or another credential such as a public encryption key. Although in the example of FIG. 5, each entry maps a single IP address to an indication of whether a user associated with the IP address is subscribed for sustainable routing, alternative implementations are possible in which each entry 502 maps an IP range to an indication of whether the addresses in the IP range are subscribed for sustainable routing. As used herein, the term user may refer to a person, an organization, a client device, and/or any other entity that sends (directly or indirectly) requests to the data center system 110.

In one aspect, FIG. 5 illustrates that sustainable routing may be provided as a service, only to users that are subscribed for the service. When a user is subscribed for the service, requests from the user that are submitted to the load balancer 112 (and/or data center system 110) may be routed by using either the sustainable routing logic 212 or the non-sustainable routing logic 206 of the load balancer 112. When a user is not subscribed for the service, requests from the user may be routed only by using the non-sustainable routing logic 206 of the load balancer 112. In other words, the sustainable routing logic 212 may not be used to route requests from a user that is not subscribed to the service. There may be various reasons for an organization (or another user) to subscribe to the service. For instance, in some jurisdictions, there may be legal regulations that require a certain part of an organization's IT operations to use green energy. As another example, some organizations may just want to advertise the use of green energy to gain the good will of their customer base.

FIG. 5 is provided as an example only. In this regard, it will be understood that the present disclosure is not limited to any specific organization of the subscription database. For instance, in an alternative implementation, the subscription may just be a list that identifies all (or at least some) of a plurality of users that have subscribed for sustainable routing.

Figure 6:
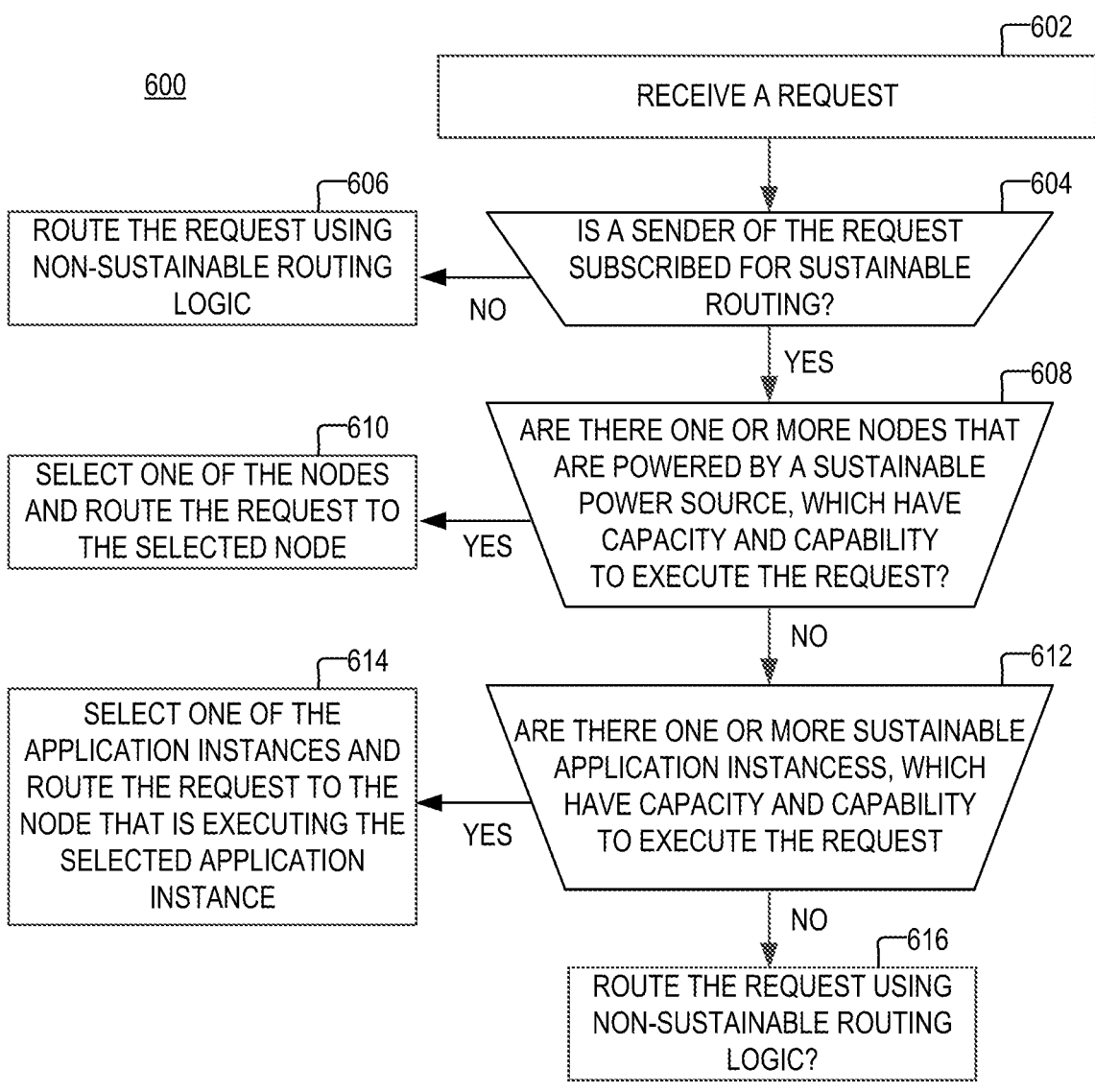
FIG. 6 is a flowchart of an example of a process, according to aspects of the disclosure.

FIG. 6 is a flowchart of an example of a process 600 that is performed by the load balancer 112. Although in the example of FIG. 6 the process 600 is performed by the load balancer 112, it will be understood that the present disclosure is not limited to any specific entity performing the process 600.

At step 602, the load balancer 112 receives a request to perform an action. The action may be an action that can be performed by one of Applications 1-4. The request may include an opcode corresponding to the action. In addition, in some implementations, the request may include one or more input parameters. In some implementations, the request may be received from one of the computing devices 130 (shown in FIG. 1).

At step 604, the load balancer 112 detects whether a sender of the request is subscribed for sustainable routing. In some implementations, the load balancer 112 may perform step 604 by obtaining the IP address (or another identifier) of the sender of the request, and performing a search of the subscription database 211 to determine whether the IP address or other identifier is listed as being subscribed for sustainable routing. However, it will be understood that the present disclosure is not limited to any specific method for detecting whether the sender of the request is subscribed for sustainable routing. If the sender of the request is subscribed for sustainable routing, the process 600 proceeds to step 608. Otherwise, if the sender of the request is not subscribed for sustainable routing, the process 600 proceeds to step 606.

At step 606, the load balancer 112 routes the request by using the non-sustainable logic 206 (shown in FIGS. 2-3.) Specifically, the load balancer 112 may execute one or more rules that are part of the non-sustainable logic 206 to select a node in one of data centers 310 and 320, after which the load balancer 112 may transmit the request (over a communications network) to the selected node. As noted above, those rules may be neutral (i.e., agnostic) with respect to whether any of the nodes in data centers 310 and/or 320 is powered by a green source and/or any application instance is designated as a sustainable application. In other words, at step 606, the request may be routed by using any conventional method for routing and/or load balancing that is known in the art.

At step 608, the load balancer 112 may detect whether there are one or more nodes in the data center system 110 that are powered by a sustainable power source, which have the capacity and the capability for executing the request. For example, the load balancer 112 may extract the action opcode from the request (received at step 602) to identify what application the request is for. Next, the load balancer 112 may use the database 302 to obtain a first list of all (or at least some) of the nodes in data center 310 and/or 320 that execute instances of the application that is suitable for executing the request. Next, the load balancer 112 may use the context assessor 304 to determine the utilization level of each of the identified nodes. Next, the load balancer 112 may remove from the first list all nodes whose utilization level exceeds a threshold. Next, the load balancer 112 may use the capacity database 302 to identify all of the nodes in the first list that are powered by a sustainable energy source. Next, the load balancer 112 may remove from the first list all nodes that are not powered by a sustainable energy source. And finally, the load balancer 112 may determine if the first list is empty. If the first list is empty, the load balancer 112 may determine that there are no nodes that are powered by a green energy source which have the capacity and capability to execute the request, in which case the process 600 proceeds to step 612. Otherwise, if the first list is not empty, the load balancer 112 may determine that there is at least one node that is powered by a sustainable energy source, and which has the capability and capacity to execute the request, in which case the process 600 proceeds to step 610.

At step 610, the load balancer selects one of the nodes in the first list (determined at step 608) and routes the request to the selected node. Routing the request may include transmitting the request to the selected node over a communications network. If there is only one node in the first list, the request may be routed to that node. If there is more than one node in the first list, one of the nodes may be selected based on a selection rule that is part of the sustainable routing logic 212. For example, the selection rule may provide that the node with the lowest utilization level among the nodes in the first list should receive the request. However, the present disclosure is not limited to any specific criterion or set of criteria for selecting a node.

At step 612, the load balancer 112 detects whether there are one or more sustainable application instances, which have the capacity or capability to execute the request. For example, the load balancer 112 may extract the action opcode from the request (received at step 602) to identify what application the request is for. Next, the load balancer 112 may use the database 302 to obtain a second list of all (or at least some) of the nodes in data center 310 and/or 320 that execute the instances of the application that is suitable for executing the request. In some implementations, the second list may include identifiers of the nodes. Additionally or alternatively, the second list may include a respective identifier for each application instance that is executed on any of the identified nodes, and which is configured to execute the request. For example, when a node executes two instances of the same application, the second list may include a different identifier for each instance. Next, the load balancer 112 may use the context assessor 304 to determine the utilization level of each of the identified application instances. Next, the load balancer 112 may remove from the second list all application instances whose utilization level exceeds a threshold. Next, the load balancer 112 may use the capacity database 302 to identify which ones of the application instances that remain in the second list are designated as sustainable applications. Next, the load balancer 112 may remove from the second list all application instances that are identified as non-sustainable. And finally, the load balancer 112 may determine if the second list is empty. If the second list is empty, the load balancer 112 may determine that there no application instances that are identified as sustainable, and which have the capacity and capability to execute the request, in which case the process 600 proceeds to step 616. Otherwise, if the second list is not empty, the load balancer 112 may determine that there is at least one application instance that is identified as sustainable and has the capability and capacity to execute the request, in which case the process 600 proceeds to step 614.

At step 614, the load balancer 112 selects one of the application instances in the second list (compiled at step 612) and routes the request to the selected application instance. Routing the request to the selected application may include identifying the node that this executing the selected application instance and transmits (over a communications network) the request to the identified node. When the second list identifies only one application instance, the request may be routed to that application instance. When the second list identifies multiple application instances, the request may be routed in accordance with one or more selection rules that are part of the routing logic 212. For example, the load balancer 112 may identify the respective node that is executing each of the application instances in the second list, and route the second request to the node that has the lowest utilization among all of the identified nodes. As another example, the load balancer may identify the respective utilization level of each of the application instances in the list, select the application instance that has the lowest utilization level among all application instances in the second list, and route the request to the node that is executing the selected application instance.

At step 616 the load balancer 112 routes the request by using the non-sustainable logic 206 (shown in FIGS. 2-3). Step 616 may be performed in the same manner as step 606.

In some implementations, the process 600 may be used to perform routing only during certain times of the day when the cost of power is higher and/or the data centers 310 and/or 320 are experiencing higher energy consumption. At all other times of the day, the non-sustainable logic 206 may be used exclusively by the load balancer 112 to perform routing. However, it will be understood that in other implementations, the process 600 may be used all the time. Stated succinctly, the present disclosure is not limited to any specific usage pattern for the process 600.

As noted above, some current sustainable software solutions suffer from several disadvantages, including higher energy cost, reduced software performance, and increased cost of software development. The process 600 addresses these disadvantages in the following ways. For example, the routing to sustainable applications does not require the use of more expensive power (i.e., i.e., power from sustainable power sources) as the sustainable application may also be powered by non-sustainable sources (while using less power than non-sustainable applications). In another aspect, the process 600 does not necessarily result in increased cost of software development, as sustainable applications may be differentiated by simply limiting the number of active threads they have. As can be readily appreciated, sustainable applications may have reduced performance relative to non-sustainable ones. However, because the process 600 enables the execution of sustainable applications alongside non-sustainable applications, the process 600 does not preclude the use of sustainable applications when performance is of the essence.

Figure 7:
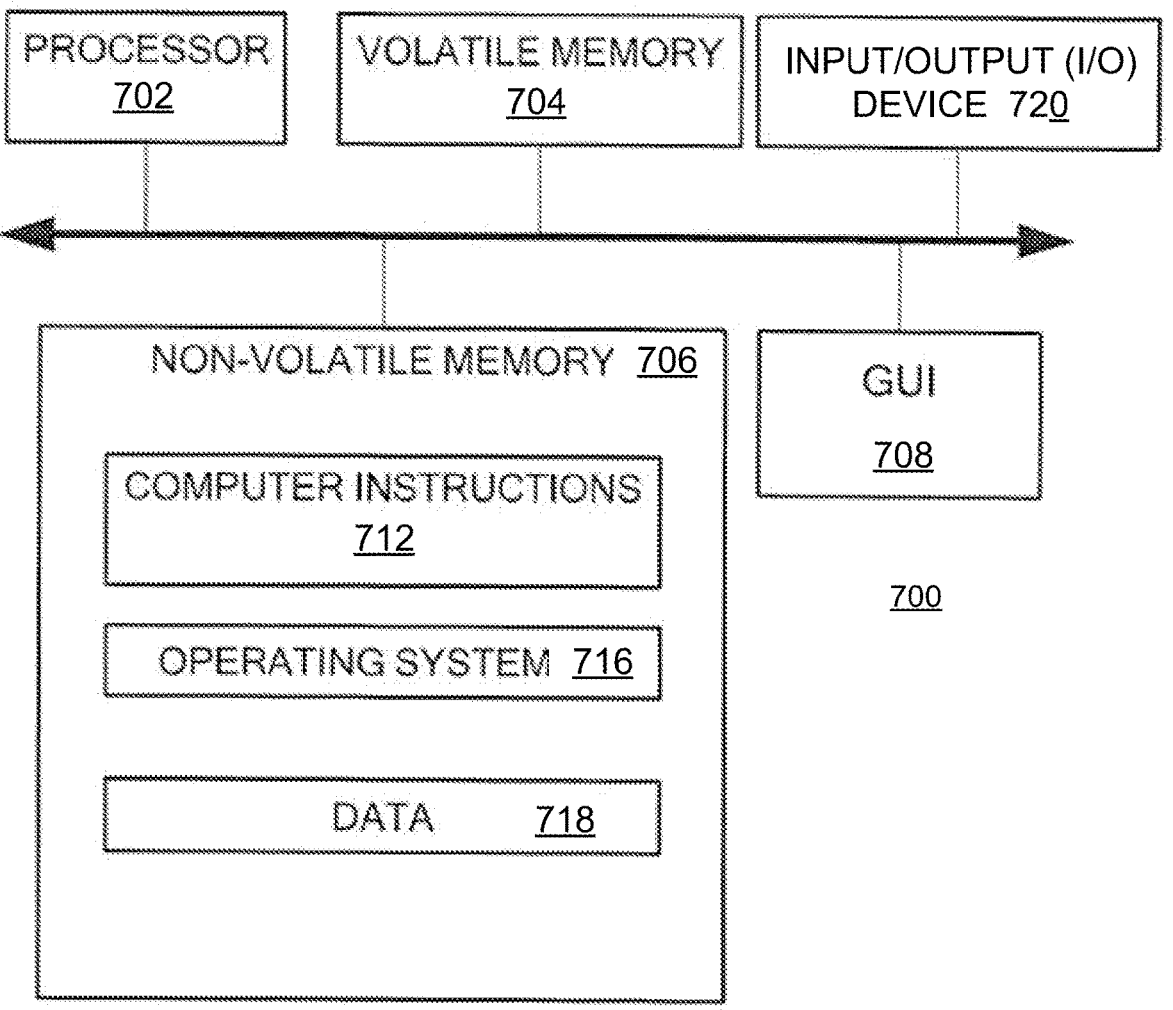
FIG. 7 is a diagram of an example of a computing device, according to aspects of the disclosure.

Referring to FIG. 7, in some embodiments, a computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
storing, in a memory, a database that identifies whether each of a plurality of nodes is powered by a sustainable power source or a non-sustainable power source;
receiving a request to perform an action;
detecting whether the plurality of nodes includes one or more candidate nodes, each of the candidate nodes being a node that is powered by a sustainable power source and has both capacity and capability to execute the request, the detecting being performed based, at least in part, on the database;

14 when the plurality of nodes includes one or more candidate nodes that are powered by a sustainable power source, routing the request to one of the candidate nodes that are powered by a sustainable power source; and
when the plurality of nodes does not include any candidate nodes, routing the request by executing a routing process that does not consider whether any of the plurality of nodes is powered by a sustainable power source,
wherein each of the plurality of nodes includes a computing device that is part of a respective data center.

2. The method of claim 1, wherein the database further identifies each of a plurality of application instances as either sustainable or non-sustainable, each of the plurality of application instances being executed on a respective one of the plurality of nodes.

3. The method of claim 2, wherein the routing process includes the operations of:
detecting whether the plurality of application instances includes one or more candidate application instances, each of the candidate application instances being an application instance that is identified as sustainable, the detecting being performed based, at least in part, on the database;
when the plurality of application instances includes one or more candidate application instances, selecting one of the candidate application instances and routing the request to one of the plurality of nodes on which the selected candidate application instance is executed; and
when the plurality of application instances does not include any candidate application instances, routing the request by executing one or more additional routing rules.

4. The method of claim 3, wherein the plurality of application instances includes a first application instance that is identified as sustainable and a second application instance that is identified as non-sustainable, both the first application instance and the second application instance being configured to execute the request.

5. The method of claim 3, wherein the one or more additional routing rules are neutral with respect to whether a node is powered by a sustainable power source or executing any sustainable application instances.

6. The method of claim 1, wherein at least two of the plurality of nodes are part of different data centers.

7. The method of claim 1, further comprising detecting whether a sender of the request is registered for sustainable routing, wherein the detecting of whether the plurality of nodes includes one or more candidate nodes is performed only when the sender is registered for sustainable routing, such that, when the sender is not registered for sustainable routing, the request is routed by executing one or more routing rules that are neutral with respect to whether a node is powered by a sustainable power source or executing any sustainable application instances.

8. The method of claim 1, wherein a sustainable power source includes one of a solar power source, a hydropower source, or a wind power source, and a non-sustainable power source includes a fossil fuel power source.

9. A system comprising:
a memory configured to store a database that identifies whether each of a plurality of nodes is powered by a sustainable power source or a non-sustainable power source; and at least one processor that is operatively coupled to the memory, the at least one processor being configured to perform the operations of:

receiving a request to perform an action;

detecting whether the plurality of nodes includes one or more candidate nodes, each of the candidate nodes being a node that is powered by a sustainable power source and has both capacity and capability to execute the request, the detecting being performed based, at least in part, on the database;

when the plurality of nodes includes one or more candidate nodes that are powered by a sustainable power source, routing the request to one of the candidate nodes that are powered by a sustainable power source; and when the plurality of nodes does not include any candidate nodes, routing the request by executing a routing process that does not consider whether any of the plurality of nodes is powered by a sustainable power source, wherein each of the plurality of nodes includes a computing device that is part of a respective data center.

10. The system of claim 9, wherein the database further identifies each of a plurality of application instances as either sustainable or non-sustainable, each of the plurality of application instances being executed on a respective one of the plurality of nodes.

11. The system of claim 10, wherein the routing process includes the operations of:

detecting whether the plurality of application instances includes one or more candidate application instances, each of the candidate application instances being an application instance that is identified as sustainable, the detecting being performed based, at least in part, on the database;

when the plurality of application instances includes one or more candidate application instances, selecting one of the candidate application instances and routing the request to one of the plurality of nodes on which the selected candidate application instance is executed; and when the plurality of application instances does not include any candidate application instances, routing the request by executing one or more additional routing rules.

12. The system of claim 11, wherein the plurality of application instances includes a first application instance that is identified as sustainable and a second application instance that is identified as non-sustainable, both the first application instance and the second application instance being configured to execute the request.

13. The system of claim 11, wherein the one or more additional routing rules are neutral with respect to whether a node is powered by a sustainable power source or executing any sustainable application instances.

14. The system of claim 9, wherein at least two of the plurality of nodes are part of different data centers.

15. The system of claim 9, further comprising detecting whether a sender of the request is registered for sustainable routing, wherein the detecting of whether the plurality of nodes includes one or more candidate nodes is performed only when the sender is registered for sustainable routing, such that, when the sender is not registered for sustainable routing, the request is routed by executing one or more routing rules that are neutral with respect to whether a node is powered by a sustainable power source or executing any sustainable application instances.

16. The system of claim 9, wherein a sustainable power source includes one of a solar power source, a hydropower source, or a wind power source, and a non-sustainable power source includes a fossil fuel power source.

17. A non-transitory computer-readable medium storing one or more processor-executable instructions, which, when executed by at least one processor, cause the at least one processor to perform the operations of:

storing, in a memory, a database that identifies whether each of a plurality of nodes is powered by a sustainable power source or a non-sustainable power source;

receiving a request to perform an action;

detecting whether the plurality of nodes includes one or more candidate nodes, each of the candidate nodes being a node that is powered by a sustainable power source and has both capacity and capability to execute the request, the detecting being performed based, at least in part, on the database;

when the plurality of nodes includes one or more candidate nodes that are powered by a sustainable power source, routing the request to one of the candidate nodes that are powered by a sustainable power source; and when the plurality of nodes does not include any candidate nodes, routing the request by executing a routing process that does not consider whether any of the plurality of nodes is powered by a sustainable power source, wherein each of the plurality of nodes includes a computing device that is part of a respective data center.

18. The non-transitory computer-readable medium of claim 17, wherein the database further identifies each of a plurality of application instances as either sustainable or non-sustainable, each of the plurality of application instances being executed on a respective one of the plurality of nodes.

19. The non-transitory computer-readable medium of claim 18, wherein the routing process includes the operations of:

detecting whether the plurality of application instances includes one or more candidate application instances, each of the candidate application instances being an application instance that is identified as sustainable, the detecting being performed based, at least in part, on the database;

when the plurality of application instances includes one or more candidate application instances, selecting one of the candidate application instances and routing the request to one of the plurality of nodes on which the selected candidate application instance is executed; and when the plurality of application instances does not include any candidate application instances, routing the request by executing one or more additional routing rules.

20. The non-transitory computer-readable medium of claim 19, wherein the plurality of application instances includes a first application instance that is identified as sustainable and a second application instance that is identified as non-sustainable, both the first application instance and the second application instance being configured to execute the request.

* * * * *